Nov. 8, 1966  D. R. HANSEN ETAL  3,284,096
BICYCLE ACCESSORY
Filed May 20, 1966                        3 Sheets-Sheet 1
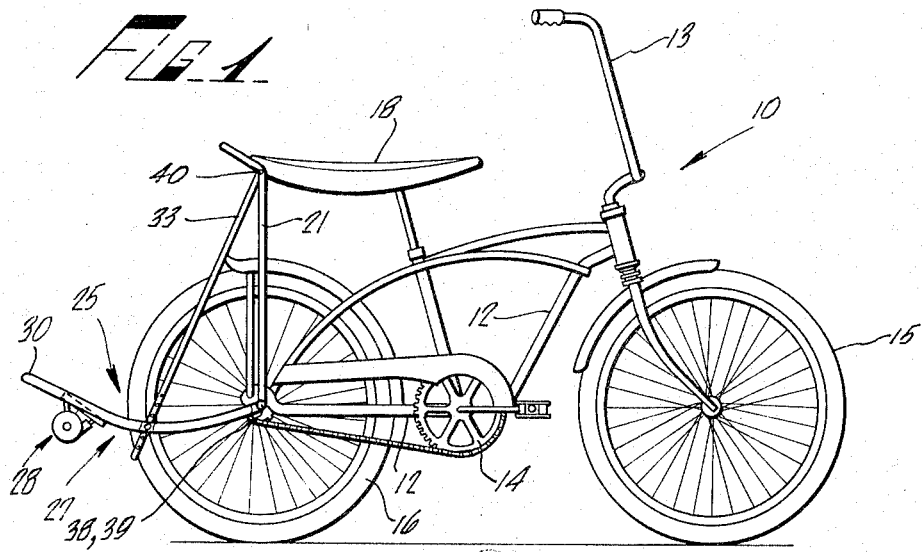
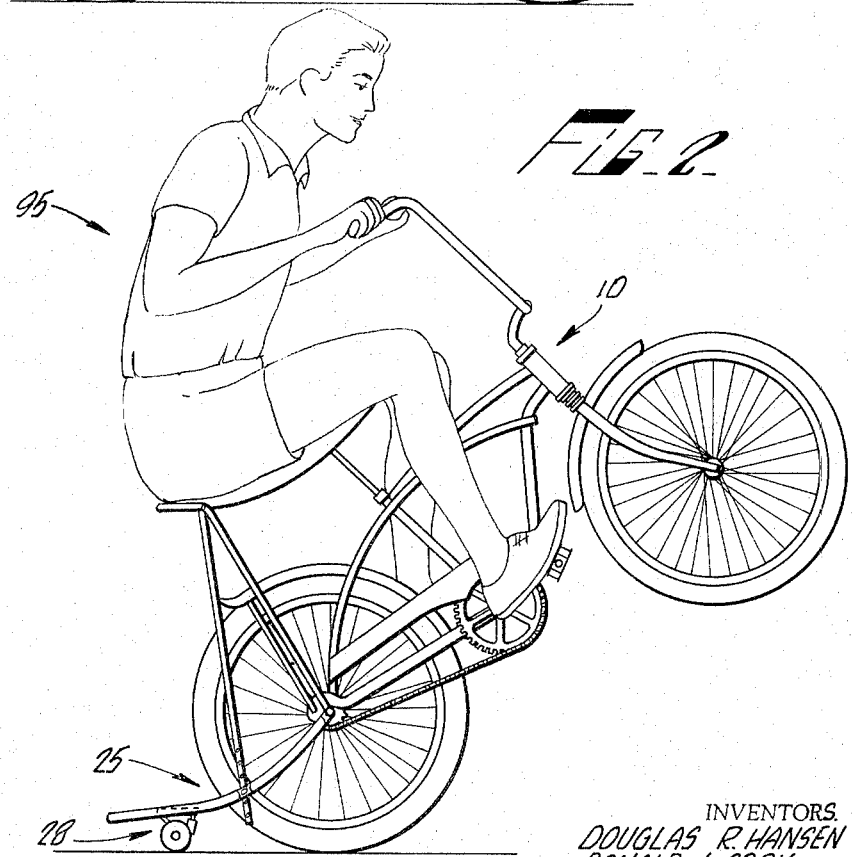
INVENTORS.
DOUGLAS R. HANSEN
DONALD L. COOK
BY
Christie, Parker & Hale
ATTORNEYS.

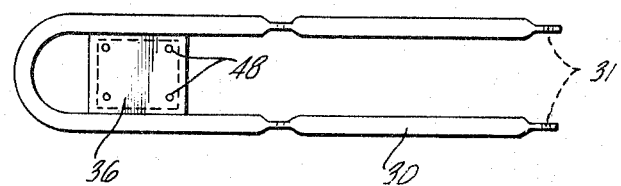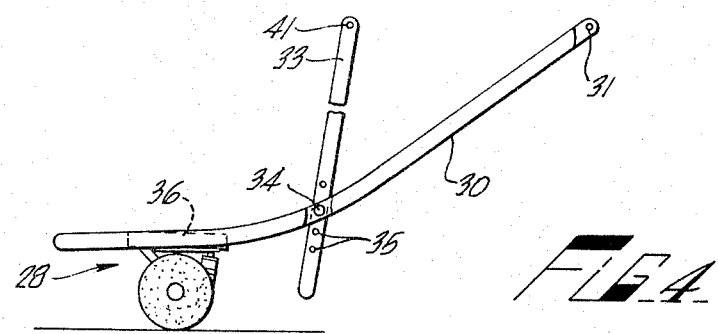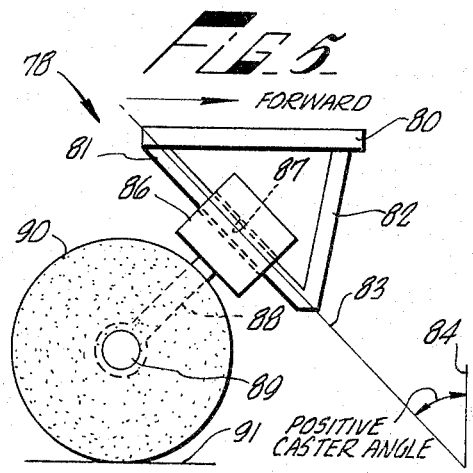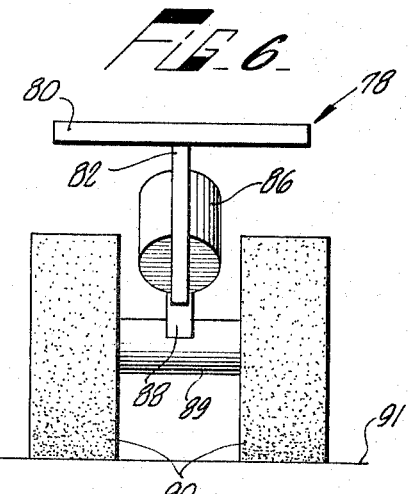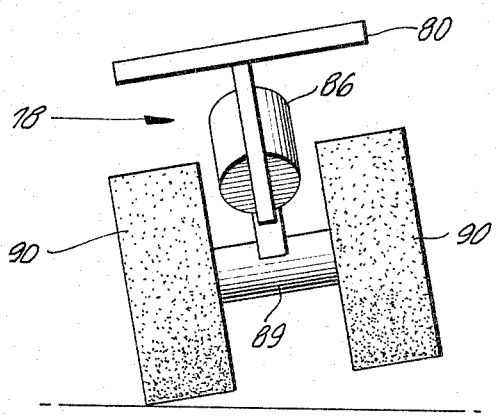

Nov. 8, 1966 D. R. HANSEN ETAL 3,284,096
BICYCLE ACCESSORY
Filed May 20, 1966 3 Sheets-Sheet 3
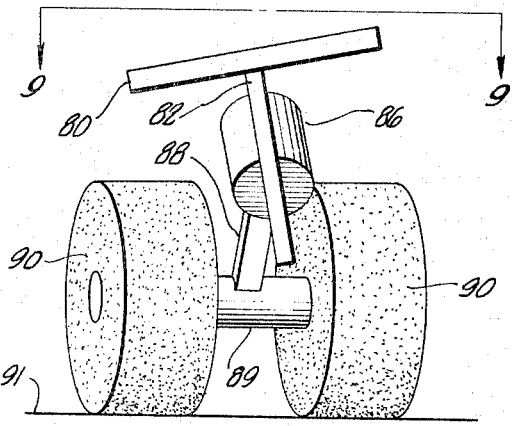
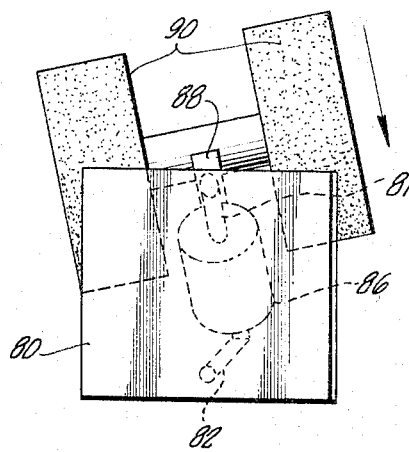
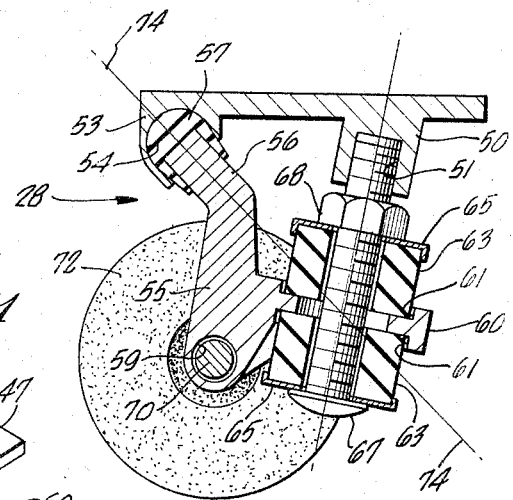
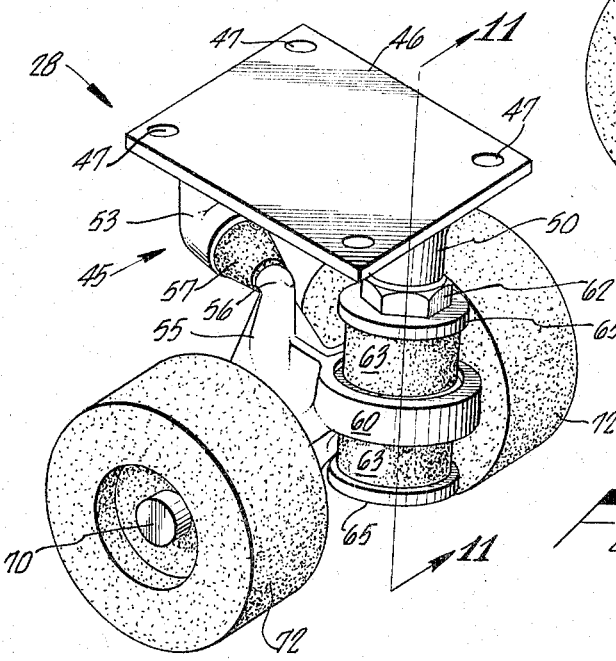
INVENTORS.
DOUGLAS R. HANSEN
DONALD L. COOK
BY
ATTORNEYS.

United States Patent Office 3,284,096
Patented Nov. 8, 1966

3,284,096
BICYCLE ACCESSORY
Douglas R. Hansen and Donald L. Cook, both of Santa Monica, Calif., assignors to Wham-O Mfg., Co., San Gabriel, Calif., a corporation of California
Filed May 20, 1966, Ser. No. 551,699
9 Claims. (Cl. 280—289)

This application relates to a bicycle accessory, and is directed to subject matter similar to that disclosed in our copending U.S. patent application, Serial Number 477,781 filed August 6, 1965, the benefit of this earlier filing date being claimed in accordance with the provisions of 35 U.S.C. 120.

A popular and challenging maneuver for a bicycle rider is to raise the bicycle front wheel off the ground while under way, and thereafter to maintain forward progress and perhaps to perform turns while balancing on the bicycle rear wheel alone. This maneuver has gained popularity in recent years with the emergence of compact sports-model bicycles with relatively small wheels (typically 20-inch diameter, in contrast to the 24- to 26-inch wheels of a conventional bicycle), high handle bars, and an elongated seat which permits the rider to move back and forth to adjust the center of gravity of the bicycle.

While competence in performing rearing, single-wheel acrobatics can be acquired with diligent practice, these maneuvers are relatively hazardous as the danger of a rearward fall is ever present, and the rider can suffer head injuries in this type of fall. This hazard is particularly acute for beginners who have not acquired the delicate sense of coordination, balance and timing required for controlled execution of single-wheel maneuvers.

It has previously been proposed that the bicycle be modified to limit rearward tilt as the rider rotates the bicycle up and back about the rear-wheel axis of rotation. These modifications have typically involved securing to the bicycle frame a member which extends behind the rear wheel and above the ground when the bicycle front wheel is in normal ground contact. As the bicycle is rotated rearwardly, the member moves down into ground contact to prevent a backward fall. In one form of the modification, the rear end of the member includes a roller to reduce friction during straight-ahead maneuvers while the roller is in ground contact.

Known designs of this modification have reduced the danger of a rearward fall, but are of limited utility as the member or member-and-roller combination do not permit easy execution of safe, controlled turns, and are limited to straight-ahead maneuvers. Adroit performance of sharp turns, circles, and figure-eight courses is the goal of most riders who develop skill in bicycle riding with the bicycle front wheel out of ground contact. Our invention is concerned with the accomplishment of this goal.

We have found that proficiency in many types of tilting or rearing maneuvers can be achieved by mounting a steerable roller at the end of a member which extends back from the bicycle rear wheel. A simple castered roller which steers about a vertical caster axis produces some improvement over an unsteerable roller, but is unstable and unpredictable in its motion. Smooth, controlled steering is achieved by mounting the roller to steer about an axis which is rearwardly inclined with respect to the direction of forward motion of the bicycle. In steering-geometry terms, such an axis is specified as having a positive caster angle, and this terminology is discussed in detail below.

Our steerable-roller bicycle accessory is unique in adapting a conventional bicycle for controlled maneuvering in a tilted position with the bicycle front wheel out of ground contact. The accessory can be removed after the rider acquires proficiency, but many riders may prefer leaving it permanently in place as it permits the execution of unusually short turns and tight maneuvers such as figure eights. Both maneuverability and protection against rearward overturning are provided by the use of the accessory which can be assembled from readily available, inexpensive components.

The accessory is not limited in application to conventional manually operated bicycles as it has utility when mounted on motorcycles, scooters and the like. The term "bicycle" is therefore used in this application in its broadest sense, and is intended to define a vehicle having two wheels, one in front of the other, which may be driven by pedals or a motor.

Briefly stated, the invention includes a steering means, and an attachment means adapted to be secured to the frame of a bicycle to extend rearwardly from the axis of rotation of a rear wheel on the bicycle. Mounting means are secured to the steering means and the attachment means for mounting the steering means to contact the ground rearwardly of a ground-contact point of the rear wheel when the front wheel is raised out of ground contact, and whereby the steering means is rotatable about an axis which is inclined at a positive caster angle to the ground when the steering means contacts the ground.

In a preferred form, the steering means comprises an axle and a roller rotatably mounted on the axle, and the caster axis is inclined to the ground at an angle of about 45 degrees when the roller is in ground contact. Preferably, a pair of spaced-apart rollers are mounted on the axle for independent rotation, and the mounting means includes resilient means urging the axle into a position parallel to the bicycle rear wheel axis of rotation.

The invention will be described in detail with reference to the attached drawings, in which:

FIG. 1 is a side elevation of a bicycle incorporating the accessory of this invention;

FIG. 2 is a side elevation of a rider on the bicycle shown in FIG. 1, the bicycle being tilted rearwardly to place the accessory in ground contact;

FIG. 3 is a plan view of an attachment bar for the accessory;

FIG. 4 is a side elevation of the accessory detached from the bicycle;

FIG. 5 is a side elevation of a castered roller assembly;

FIG. 6 is a front elevation of the roller assembly;

FIG. 7 is a view similar to FIG. 6, showing the roller assembly tilted sideways with respect to the ground;

FIG. 8 is a perspective view of the roller assembly showing steering action resulting from sideways tilting;

FIG. 9 is a view along line 9—9 of FIG. 8;

FIG. 10 is a perspective view of a preferred form of a roller assembly; and

FIG. 11 is a view along line 11—11 of FIG. 10.

Referring to FIG. 1, a compact, sports-model bicycle 10 includes the usual frame 12, handlebars 13, pedals and chain drive 14, front and rear wheels 15 and 16 rotatably secured to the frame, elongated seat 18, and seat support members 20 and 21 secured to the seat and frame. These elements are all conventional, and need not be described in detail, their counterparts being found in any of the various styles of bicycles, motorcycles and the like.

A bicycle accessory 25 according to the invention is secured to bicycle 10, and includes an attachment means 27 and a roller assembly 28. The attachment means, as shown in FIGS. 1, 3 and 4, comprises an elongated U-shaped bar 30 having a mounting hole 31 at each of its ends. A pair of elongated brace members 33 are secured to opposite sides of bar 30 by a pair of bolts 34. Each brace member includes a plurality of holes 35 therethrough to accommodate a respective bolt 34 and to provide adjustment of the height above the ground of roller assembly 28. A mounting plate 36 is secured by welding or any other convenient means between the legs of U-shaped bar 30 adjacent its closed end.

As best seen in FIG. 1, attachment means 27 is secured to bicycle 10 over a rear axle 38 of the bicycle rear wheel. Threaded ends of axle 38 extend through holes 31 in bar 30, and the bar is secured in place by threading a pair of nuts 39 on the axle ends against the bar. Brace members 33 extend upwardly from the bar to be secured to seat support member 21 adjacent seat 18 by a pair of bolts 40 extending through a mounting hole 41 at the upper end of each brace member.

A preferred form of roller assembly 28 is shown in detail in FIGS. 10 and 11, and in the illustrated form is similar to the trucks or roller assemblies used on currently popular skateboards. The roller assembly includes a mounting means 45 having a base 46 with a plurality of mounting holes 47 through which extend bolts 48 to secure the base to mounting plate 36 as seen in FIG. 3. A front boss 50 is formed on the underside of the base adjacent its front edge, and an internally threaded hole 51 extends upwardly into the boss. A rear boss 53 is formed on the underside of base 46 adjacent its rear edge, and a round socket 54 is formed in the rear boss.

An axle strut 55 has an upwardly and rearwardly (as seen in FIGS. 10 and 11) extending round rear leg 56. A resilient rubber cap 57 is slipped over the end of rear leg 56, and the cap has a round outer surface which seats in socket 54 in the base. Axle strut 55 can thus be pivotally rotated about the base in the usual fashion of a ball-and-socket joint.

A central portion of the axle strut includes a lateral bore 59 to accommodate an axle. Extending forwardly from the bore, and integrally formed with the axle strut, is a hollow ring 60. A pair of annular recesses 61 are formed in the upper and lower surfaces of the ring, and a pair of thick, resilient rubber grommets 63 are seated above and below the ring in the recesses. A pair of cup washers 65 are installed over the ends of the grommets away from ring 60. A bolt 67 extends through the washers, grommets, and hollow ring to be threaded into hole 51 in boss 50 on the underside of the roller-assembly base. A nut 68 is threaded on bolt 67 against the upper cup washer to adjust the pressure of the grommets against the ring.

An axle 70 extends through bore 59 and is secured to the axle strut in any conventional fashion. A pair of spaced-apart rollers 72 are rotatably mounted on opposite ends of axle 70, and are secured to the axle by conventional ball-bearing mounts (not shown) for freedom of rotation. The ball-and-socket mounting of rear leg 56 and cap 57 in socket 54, and the resilient mounting of ring 60 on grommets 63 permits the axle to rotate to a limited extent about a caster axis 74 shown as a dashed line in FIG. 11. The lengths of rear leg 56 of the axle strut and bolt 67 are chosen to position this caster axis to tilt rearwardly (with respect to the direction of forward motion of the roller assembly) from a line perpendicular to the ground when the roller is in ground contact, the angle between the caster axis and perpendicular line preferably being approximately 45 degrees.

The steering geometry of roller assembly 28 is most easily understood in terms of a similar but somewhat simplified roller assembly 78 shown in FIGS. 5–9. This simplified roller assembly includes a base 80, a round, elongated kingpin 81 rigidly secured at the rear end of the underside of base 80 and extending downwardly and forwardly in the direction of forward motion of the assembly, and a support leg 82 rigidly secured to the forward end of the kingpin and the underside of the forward end of the base to brace the kingpin.

As shown in FIG. 5, the kingpin is rearwardly inclined with respect to the direction of forward motion of the roller assembly, and a longitudinal axis of the kingpin defines a caster axis 83. The angle between the caster axis and an axis 84 which is perpendicular to the ground is defined as the caster angle. The caster angle by definition is positive when the caster axis is rearwardly inclined with respect to perpendicular axis 84, and is negative when the caster axis is forwardly inclined with respect to perpendicular axis 84.

A sleeve 86 is journaled on kingpin 81, the kingpin extending through a hole 87 in the sleeve, and the sleeve is free to rotate about the kingpin. An axle strut 88 is secured to the sleeve and extends downwardly and rearwardly to be rigidly secured to an axle 89. A pair of rollers 90 are rotatably secured at opposite ends of the axle for free, independent rotation about the axle.

As seen in FIGS. 5 and 6, roller assembly 78 is positioned with rollers 90 resting flat on a horizontal ground plane 91, and with the upper surface of base 80 positioned horizontally. In the front view of the roller assembly in FIG. 7, the base has been tipped out of a horizontal position as would occur if a rider standing on or otherwise supported by the base tilted or banked his body to the right in preparation for a right turn. If sleeve 86 was rigidly secured to kingpin 81, axle 89 would be forced to tilt with respect to the ground as shown in FIG. 7, lifting the rollers out of full ground contact. However, sleeve 86 can rotate about the kingpin, and the weight of a rider pressing down on base 80 forces this rotation to take place automatically.

FIGS. 8 and 9 illustrate the position of the roller assembly after rotation of the sleeve around the kingpin has taken place. Base 80 is in the tilted or banked position for a right turn, but rotation of the sleeve around the kingpin has positioned the axle to steer the rollers for a left turn. This is exactly the kind of turning motion that is desired in the bicycle accessory of this invention. As the rider banks to the right, the roller assembly steers to the left, forcing the rear wheel of the bicycle into a right turn because the rear wheel is mounted forward of the roller assembly. Centrifugal force developed in the turn keeps the rider from falling toward the center of the turn, and the amount of centrifugal force may be varied by controlling the speed of the bicycle. A negative caster angle of the kingpin in the roller assembly will not produce the desired turning action, as a negatively castered axle and rollers will turn in the direction of bank or base inclination instead of away from the angle of bank as occurs with a positive caster angle.

Roller assembly 28, shown in FIGS. 10 and 11, functions in the same general manner as roller assembly 78 just described. Axle strut 55 rotates about caster axis 74 to produce an opposite-turning reaction of axle 70 and rollers 72 in response to sideways tilting or banking of base 46 which occurs when the bicycle rider banks the bicycle. That is, axle strut 55 as mounted in roller assembly 28 is the equivalent of kingpin 81, sleeve 86, and strut 88 in roller assembly 78.

Preferably, the caster axis of the roller assembly is rearwardly inclined from an axis vertical to the ground at an angle of approximately 45 degrees when the roller-assembly rollers are in ground contact. This caster-axis rearward inclination or positive caster angle provides stability and adequate turning action, and is therefore preferred for short-radius turns and other advanced maneuvers. However, other positive caster angles will produce satisfactory results, and any positive caster angle between 10 degrees and 80 degrees has been found to produce adequate turning response of the roller assembly, the turning response increasing as the positive caster angle decreases.

In the various forms of roller assemblies illustrated in the drawings, stability is provided by positioning the ground-contact point of the rollers behind a point where the caster axis intersects the ground. That is, the rollers trail or "follow" the caster axis, and tend to return to a stable, straight-ahead position. The concept of the invention, however, is not limited to roller assemblies having this orientation of caster axis and roller ground-contact point. That is, the rollers may be positioned such that the ground-contact point of the rollers is ahead of the intersection of the caster axis with the ground and a strong spring can be employed to urge the rollers into a straight-ahead position, overcoming the natural tendency of the rollers to rotate back into a trailing position. Preferably, the rollers should trail the caster axis as greater stability is provided by this geometry.

Referring to FIG. 2, a rider 95 on bicycle 10 has shifted his position rearwardly on the bicycle seat, shifting the center of gravity of the rider-bicycle combination whereby the bicycle may be rotated upwardly and rearwardly about the axis of rotation of the rear wheel. The bicycle front wheel is lifted entirely out of ground contact, and the bicycle is tilted rearwardly until roller assembly 28 contacts the ground, limiting further rearward tilt and preventing an overturning accident. Straight-ahead maneuvers may be executed in this position, and turns are initiated simply by banking the bicycle in the direction of the desired turn.

For example, if the rider banks to the right, the base of the roller assembly is forced to bank to the right, and the roller-assembly axle rotates about the caster axis to turn the rollers toward the left with respect to the direction of forward motion. As the roller assembly is mounted behind the rear wheel, the roller assembly steers the bicycle and rider into a right turn. The turn is tightened by increasing the angle of bank, thereby increasing the opposite-turning action of the roller assembly. Tight turns and other maneuvers such as figure eights are thus easily and safely executed in a controlled manner.

Stability during turning maneuvers is provided by the positive castering action of the roller assembly, and also by resilient grommets 63 which are compressed as the axle and axle strut rotate about the caster axis of the roller assembly. The resilient grommets thus urge the rollers back toward a straight-ahead position, providing positive stability and minimizing oversteering in turning maneuvers. The amount of force exerted by the resilient grommets can be adjusted by loosening or tightening nut 68 which clamps the grommets against ring 60 of the axle strut.

Preferably, the rear end of bar 30 extends rearwardly beyond the roller assembly to provide additional protection against accidental rearward overturning. Thus, should the bicycle rear wheel lift off the ground during the execution of a maneuver, and the bicycle tend to overturn about the ground-contact point of the roller-assembly rollers, the rear end of bar 30 will contact the ground and prevent further overturning. The high drag of the rear end of bar 30 against the ground in this position tends to force the bicycle to rotate forwardly, restoring the rider to a safe, controlled position. Of course, a separate member can also be secured to bar 30 to extend back from the bar, thereby providing the desired "limit stop."

The amount of rearward inclination of the bicycle necessary to place the roller assembly in ground contact is readily adjusted by varying the position of bar 30 with respect to brace member 33. That is, the bar is pivoted about the bicycle rear wheel axle into a desired position, and then secured to the brace member by bolts 34 placed through the nearest pair of holes 35 in the brace member. For most maneuvers, satisfactory results are produced by positioning the roller assembly about five to seven inches off the ground when the bicycle is in a normal level position.

There has been described a bicycle accessory which can be attached to any conventional bicycle, and which permits the rider to achieve greater proficiency and enjoyment. It is to be understood that the invention has been described and illustrated in its preferred form, and the inventive concept may be employed in various other modified forms. For example, many other types of attachment means may be used to secure the roller assembly to the bicycle. Similarly, a single roller can be used in the roller assembly, although two spaced-apart rollers are preferred for greater stability. The term "roller" is used in a broad sense herein, and includes all the various forms of wheels including those which carry pneumatic tires. Such tires can be used in place of solid rollers when maneuvers are executed on rough surfaces such as cobblestone streets.

Types of steering means other than rollers are also useful with the accessory. For example, for maneuvering on ice, a pair of ice-skate blades may be suspended from the axle which in turn is supported by the mounting means to rotate about a positive-caster-angle axis. Just as the rollers steer the bicycle by rolling in a direction of least resistance (i.e., a direction perpendicular to the axis of rotation of the rollers), the skate blades steer the bicycle by passing over the ice in a direction of least resistance (i.e., along the longitudinal axis of the skate blades).

It is intended that all such alternative forms fall within the scope of the appended claims which define the invention.

We claim:

1. An accessory for a bicycle, the bicycle having a frame, and front and rear wheels with axes of rotation, the accessory comprising:
   steering means for changing a direction of motion of the bicycle;
   attachment means adapted to be secured to the bicycle frame to extend rearwardly from the axis of rotation of the rear wheel; and
   mounting means secured to the steering means and the attachment means for mounting the steering means to contact the ground rearwardly of a ground-contact point of the rear wheel when the front wheel is raised out of ground contact, and for mounting the steering means to be itself pivotable about an axis which is inclined at a positive caster angle in the range of about 10 degrees to about 80 degrees when the steering means contacts the ground, whereby banking of the bicycle with the steering means in ground contact causes the steering means to turn in a direction away from a direction in which the bicycle is banked.

2. The accessory defined in claim 1, and further comprising a member secured to and extending rearwardly from the attachment means behind the steering means to be normally out of ground contact when the rear wheel and steering means are in ground contact, and to be in ground contact to limit rearward overturning of the bicycle about the steering means when the bicycle front and rear wheels are both raised out of ground contact.

3. An accessory for a bicycle, the bicycle having a frame, and front and rear wheel with axes of rotation, the accessory comprising:
   an axle;
   a roller rotatably mounted on the axle;
   attachment means adapted to be secured to the bicycle frame to extend rearwardly from the axis of rotation of the rear wheel; and
   mounting means secured to the axle and the attachment means for mounting the axle whereby the roller contacts the ground rearwardly of a ground-contact point of the rear wheel when the front wheel is raised out of ground contact, and for mounting the axle to be itself pivotable about an axis which is inclined at a positive caster angle in the range of about 10 degrees to about 80 degrees when the roller contacts the ground, whereby banking of the bicycle with the steering means in ground contact causes the steering means to turn in a direction away from a direction in which the bicycle is banked.

4. The accessory defined in claim 3, in which the roller contacts the ground rearwardly of an intersection of the caster axis and the ground, whereby positive caster action is provided.

5. The accessory defined in claim 4, and further comprising a second roller rotatably mounted on the axle, the rollers being spaced apart and mounted at opposite ends of the axle.

6. The accessory defined in claim 5, in which the mounting means comprises a base adapted to be secured to the attachment means, an axle strut secured to the axle, and means secured to an undersurface of the base and pivotally secured to the axle strut whereby the axle strut is rotatable about the positive caster axis, the means including a resilient element urging the axle strut into a position which orients the axle parallel to the axis of rotation of the rear wheel.

7. The accessory defined in claim 5 in which the positive caster angle is about 45 degrees when the roller contacts the ground.

8. The accessory defined in claim 5 in which the attachment means is elongated to extend rearwardly from the mounting means to be out of ground contact when the rollers and the bicycle rear wheel are in ground contact, and to be in ground contact to limit further rearward tilting of the bicycle when the bicycle front and rear wheels are out of ground contact.

9. The accessory defined in claim 8 in which the positive caster angle is about 45 degrees when the roller contacts the ground, and in which the attachment means includes means for adjusting the height of the rollers above the ground when the bicycle front and rear wheels are in ground contact.

References Cited by the Examiner

UNITED STATES PATENTS

| D. 200,040 | 1/1965 | Brown | D90—8 |
|---|---|---|---|
| 323,289 | 7/1885 | Blount. | |
| 581,575 | 5/1897 | Douglass | 280—299 |
| 634,062 | 10/1899 | Matthews | 280—239 |
| 1,472,375 | 10/1923 | Stuart et al. | 280—87.02 |
| 1,682,764 | 9/1928 | Mohr | 280—87.01 X |
| 2,558,880 | 7/1951 | Sartain | 293—61 |
| 3,062,559 | 11/1962 | Hewitt | 280—282 |
| 3,100,020 | 8/1963 | Sonntag | 280—87.04 X |
| 3,235,282 | 2/1966 | Bostick | 280—87.04 |

FOREIGN PATENTS

| 710,566 | 6/1931 | France. |
|---|---|---|
| 895,316 | 4/1944 | France. |
| 75,185 | 5/1894 | Germany. |
| 401,320 | 1/1943 | Italy. |

KENNETH H. BETTS, *Primary Examiner.*